Patented Aug. 29, 1933

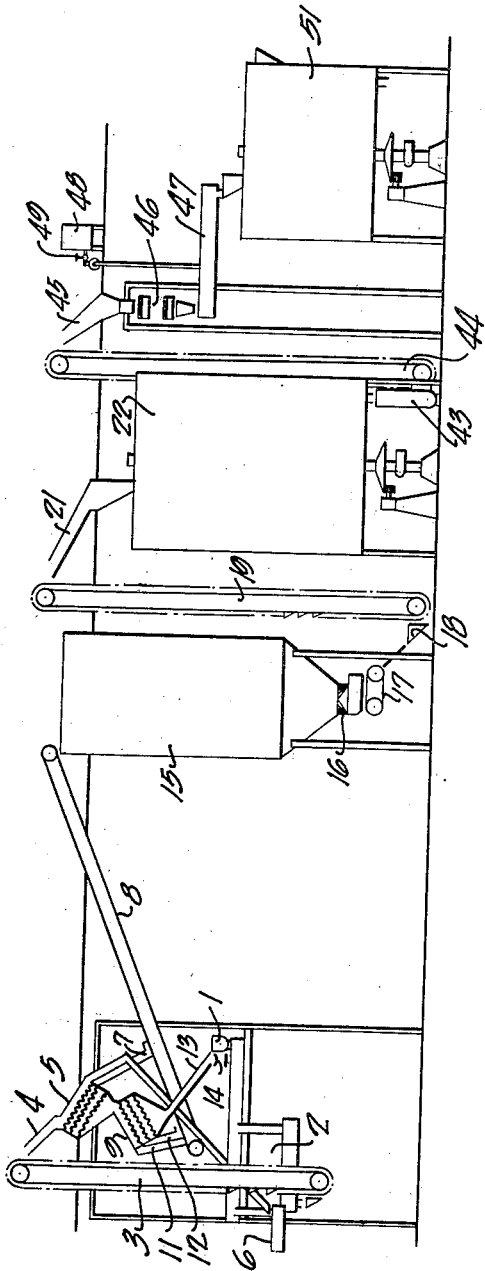

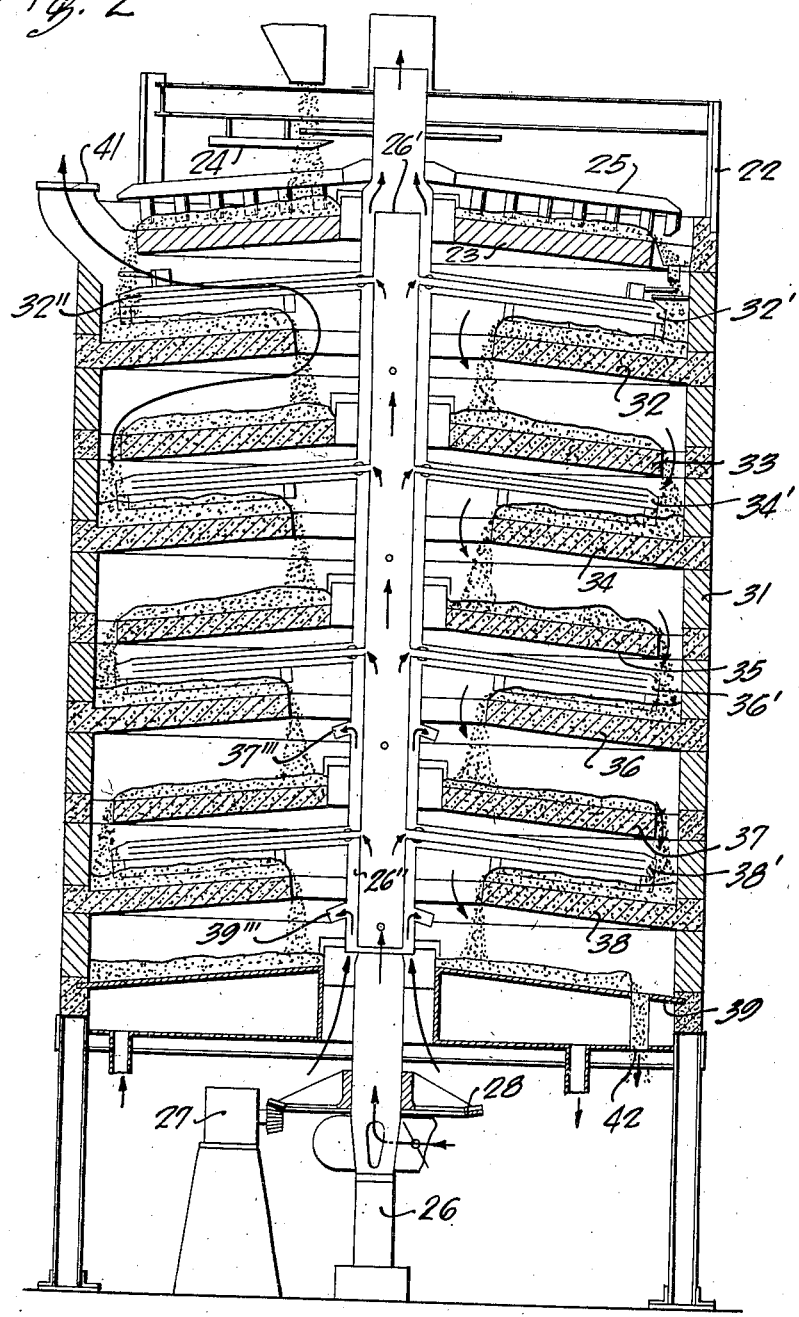

1,925,065

UNITED STATES PATENT OFFICE 1,925,065

GRANULAR MATERIAL AND METHOD OF MAKING

Ralph L. Atkinson, Dorchester, Mass., assignor, by mesne assignments, to Empire Trust Company, New York, N. Y., a corporation of New York as trustee Application February 9, 1931. Serial No. 514,373

18 Claims. (Cl. 25—156)

This invention relates to a method of making granular materials which may or may not be colored and which are suitable for such purposes as the coating or decorating of roofing sheets or the like and to the resulting products.

An object of the invention is to provide granular materials which shall be resistant not only to the physical actions encountered in manufacture, handling, storage and application, but which shall also withstand the various effects of weathering and aging when in service. A further, object is to assure the development and persistence of bright colors in such granules and tenacious adhesion to the backing or matrix material to which they are to be ultimately applied. It is also an object to effect the preparation of such granules in an economical manner from available raw materials and to carry it out in a substantially continuous operation. Again, it is an object to incorporate an appreciable proportion of the fines and dust produced in the crushing of the raw material with the finished granules to form an integrated coating thereon of different texture but of substantially the same composition. Other objects will appear from the following disclosure.

The method of the present invention includes or presupposes briefly the preliminary preparation or selection of a compact and strong, relatively dense, raw, argillaceous material such as a hard fireclay or shale (susceptible nevertheless to further hardening by heat) which is crushed to the desired size or range of sizes, the crushed material being sized by usual means to produce fines and dust (which may be substantially of colloidal dimensions and capable of forming plastic compositions suitable for molding ceramic products) and granules of the required dimensions,— larger sizes being returned for special purposes or re-crushed if desired. The sized granular product as thus obtained, which is selectively of a high degree of strength or resistance to crushing, is then subjected to a roasting treatment for such time and to such a temperature as may be required thoroughly and uniformly to heat the granules and effect the hardening of the same.

Fine particles of dust adhering to the granule surfaces may be caused to cohere more firmly therewith by the heat treatment, but sintering or anything approaching actual incipient vitrification or fusion of the body of the granules is carefully avoided.

As a modification of the above described procedure, the sized granules may be mixed with additional amounts of the dust or fines previously separated therefrom (or similar finely divided argillaceous material), preliminary to the heat treatment. When the granules are thereafter subjected to the roasting or burning treatment such dust particles are found to become affixed to the surfaces of the granules, in addition to the casually adherent dust particles above mentioned, forming an integral coating thereon. This coating is characteristically more or less discontinuous and may be of greater or less thickness, depending upon the relative amounts of dust particles which are caused to adhere to the granules. This will vary with the amount and degree of subdivision of the dust particles and the time and temperature of treatment.

The granules or dust particles, or both, may be employed in their natural condition or may be previously treated with suitable coloring agents as desired. The latter are conveniently applied in the form of solutions of mineral salts which may be decomposed by heat to colored metallic oxides, such as ferrous sulfate, for example.

In any event, the roasted granules are then cooled, and in some instances may constitute the finished product. In other cases, a second heat treatment is found advantageous. Thus, when no coloring agent has been applied to the raw granule, such addition is desired, or if more color is desired upon the granules, in addition to the first, they may be treated therewith at this stage. If a salt solution is used for example, it is found that it will penetrate and substantially saturate the individual granules, owing to the relatively high permeability and capillarity which the roasted granule structure presents.

The roasted granules may also be admixed with dust at this stage of the treatment, and the dust may or may not contain a coloring agent as desired.

The treated granules may then be subjected to a second roasting treatment, preferably at such temperature and for such time as may be required to fix the coloring agent within and upon the granule, and under suitable atmospheric conditions to provide the desired color or shade in the finished product. If the granules have received an admixture of dust particles prior to the second roasting treatment, however, the subsequent temperature should be somewhat higher and sufficient preferentially to soften and thus integrate the dust with adjacent granule surfaces and thus form a coating thereon, though without causing fusion of the granules proper. Such coating of the granules with dust is appreciably facilitated by agitation of the charge during the heat treatment. The product is then cooled and is ready for use.

A typical example of the practical application of the invention will be described with reference to the accompanying drawings in which:

Fig. 1 is a diagrammatic illustration of apparatus suitable for carrying out the invention; and Fig. 2 is a cross-section of the multiple hearth furnace, indicated in Fig. 1.

Referring to the drawings, the raw material (which may, for example, be a firmly consolidated massive clay such as that referred to as "Lower Kittanning Deposit Vein No. 3, Pennsylvania" or a more dense compact argillaceous shale, such as "Red brick shale", Watsontown Valley, Pennsylvania) is first crushed, as by passing through a usual jaw crusher (not shown) and then screened to an approximate range of sizes, the larger lumps being returned to the crusher and the smaller sizes being discharged into the screw conveyor 1. This delivers the material (not shown) to the tank or boot 2 at the bottom of bucket elevator 3 which lifts the material to the top of the apparatus and lets it fall through chute 4 upon the multiple screen 5. The oversize material is returned by gravity to a receiver 6 while the intermediate sizes pass through chute 7 to the belt conveyor 8. A single screen may be sufficient, but preferably a second series of screens 9 is provided from which the oversize may be withdrawn through chute 11, intermediate sizes through chute 12 to the belt conveyor 8 and the ultimate fines and dust through chute 13 to a separate belt conveyor 14 for removal.

The crushed granules of selective sizes delivered to the belt 8 are carried to the top of storage tank 15, in which they accumulate and provide a constant supply.

If dust coated particles are to be prepared, a portion of the fines received on the belt conveyor 14 may be diverted and added to the sized granules carried on the belt conveyor 8 and thus mixed in definite proportions therewith in the storage tank 15. The fines may be thus used as obtained directly from the screens 9 or may be further separated into dust particles, e. g. 250 mesh and finer,—and contain or consist of particles of substantially colloidal dimensions which adhere to the granules, even in the dry condition. If large proportions of dust particles are desired, they may be retained on the granules by applying a dilute solution of temporary adhesive thereto such as sugar. A coloring agent may be added to the granules or to the dust, or to both, (such as a solution of ferrous sulfate), and this may also contain or serve as the temporary adhesive. No special apparatus is required for such treatments, and hence none is shown in the drawings.

At the bottom of the tank a draw-off arrangement 16 is provided from which the granules may be directed, in a controlled stream, onto a short belt 17 and thence into the boot 18 of elevator 19. The latter picks up the granular material and elevates it to the inclined chute 21 which thus directs a relatively constant flow of raw granules into the top of the multiple hearth furnace 22 (see Fig. 2). This may comprise an open hearth 23 upon which the granules are scattered by the baffles 24 and also by the rakes 25 mounted upon the rotated vertical shaft 26 which passes through the furnace and is driven by suitable motor 27 and gears 28.

If the granules are in wet condition, they are dried upon the open hearth 23 before entering the furnace, and the dust particles thereby more firmly secured to the granules.

The furnace comprises outer cylindrical wall 31 and a plurality of horizontal hearths or shelves 32, 33, 34, 35, 36, 37, 38, and 39 respectively, (the latter preferably being cooled by water or air as shown) having openings alternately at the center and periphery of successive hearths to permit the granular material to be fed from the top hearth 23 over each of the shelves and to fall from shelf to shelf by gravity, the granules being constantly agitated on each shelf by corresponding rakes numbered 32', 34', 36', and 38', mounted upon the vertical shaft 26 and similar rakes on shelves 33, 35, 37, and 39, which, being at right angles, do not show in the drawings. The arms of the rakes may be hollow, as indicated, to conduct combustible gases from the hollow shaft 26' through inner tubes 32'' etc., and also to receive a current of air from the annular space 26'' in the shaft 26. Openings 37''' and 39''' etc., may be provided at suitably spaced points to introduce air from the channel 26'' directly into the furnace across the corresponding hearth or hearths to be provided with additional air, for oxidizing treatment, if required.

The descending granules are in this manner thoroughly and uniformly contacted with the heated air or other gases,—which (as shown by the arrows) rise through the furnace and pass off at 41.

The temperatures on the several hearths are so regulated that the granules upon passing through the furnace are subjected to a sufficient temperature and for a sufficient length of time to develop substantially a maximum degree of hardness or crushing strength short of vitrification. With the clays above indicated, for example, temperatures of 1750° to 2000° F. more or less are to be recommended, for a period of one to five hours of heat treatment. At the preferred temperatures, within this range, complete vitrification does not take place but carbonaceous and volatile matter is expelled, leaving extremely minute pores throughout the clay structure of each individual granule, and the clay substance is hardened.

In this treatment, the dust particles which are adherent to the surfaces of the granules and protrude appreciably therefrom are preferentially or more rapidly heated with respect to their softening points than are the granules proper or the solid surface thereof, in accordance with the well recognized phenomenon of heat to concentrate upon and about solid edges, corners and particles of small dimensions. Hence while the granules are hardened they are not fused, although the dust particles of the smaller sizes, e. g. those 250 mesh and finer and of colloidal dimensions,—apparently soften and adhere to the adjacent granules, thus becoming integrated therewith and imparting their discrete, finely divided, dispersed characteristics to the individual granules. Larger particles, such as fines of 150 to 250 mesh, if added with the dust, may become in turn adherent to the dust coating and thus form a relatively thick coating of appreciable dimensions, manifesting itself in the increased average size of the coated granules, in contrast to that of the original granules.

On the other hand, if a dust coating is not desired, the raw granules may be roasted without the addition of dust and subsequently agitated and rendered substantially free of any incidental dust as by an air blast, washing with water and drying, or like treatment.

As obtained by the foregoing procedures, the granules may constitute a finished product, but in case they have not been given a preliminary treatment with coloring agent or dust particles, or have been heat treated without either, further treatment is desirable and may also be effective in addition to such treatments. Thus, the roasted granules may be withdrawn at 42, where they fall into the receiver 43. The elevator 44 delivers them through chute 45 to a weighing conveyor belt 46 and thence to a treating tank 47. Here they may be wet or saturated with a regulated quantity of a liquid reagent or a coloring solution adapted to develop the inherent color of the natural constituents of the granule or to add coloring materials thereto, or both. For example, a solution of ferric sulfate or copperas may be provided from tank 48, controlled by valve 49. At this stage, dust particles as previously described may be distributed upon the dry granules or, if a solution of coloring reagent has been applied, to the thus wetted granules or in other ways as above indicated. The dust particles may be as originally obtained or may themselves be saturated with the same or a different coloring agent from that on the granules. They are, however, preferably of the same or similar composition to that of the granules. The particles may be extremely fine of colloidal dimensions, or may be of determinable mesh size, e. g. 250 mesh and finer. They may also contain coarser sizes such as fines 150-250 mesh as indicated above,— and will produce a surface coating of corresponding characteristics.

The treated granules are then led into the top of a second furnace 51, similar to the furnace shown in Fig. 2, but controlled with respect to temperature, time, and atmospheric conditions to properly convert the coloring reagent or reagents to the desired form. Thus, with granules treated with copperas, oxidizing conditions are preferable, the iron salt being decomposed to the red oxide which imparts its color to the granule. Heating to approximately 1000° F. for twenty minutes, for example, decomposes the iron salt and forms the colored residue such as the metallic (iron) oxide which is insoluble. And also, due to the fine subdivision of the deposited and disintegrated oxide, it is fixed upon and within the granules. If additional dust has been applied to the granules or if it is relatively coarse, as above indicated, higher temperatures will ordinarily be required to effect adequate integration with the granules. In either case the atmospheric conditions of the furnace are preferably so controlled as to develop and fix the desired color of the granule and determine the ultimate characteristics desired in the finished product.

Accordingly, the properties of the resulting granules are such as to eminently recommend them for application upon or in cementitious matrices, such as roofing materials, cement surfaces, and the like. The individual granule is characterized by the angular but blunt fractures of unburned or raw, compact clay or shale, and by an inherently high degree of hardness or crushing strength due to their original selective resistance to the crushing and screening operations, supplemented by the subsequent hardening by burning. Moreover, such fractures of the raw material run freely throughout the material in all directions and completely open up all lines or planes of weakness in the original raw material, in contrast to crystallized or fused materials such as igneous rocks and quartz which may be shattered and cracked without breaking up and hence contain partial fractures and incompletely developed lines of fracture, contributing a substantial element of weakness in each individual granule.

The granules, after the first roasting treatment, are rendered appreciably porous, adapting them to receive liquids and to be quickly and completely wetted thereby, but such porosity is characterized by being extremely finely divided and not great in proportion to the volume of the granules. At the same time the granules do not lose such porosity, since the final heat treatment does not effect fusion of the surfaces. The finished granule consequently retains such porosity and hence a characteristically freely wetted surface and one adapted to make a complete and intimate contact with fluid bonding materials such as Portland cement or viscous matrices such as asphalt.

The affixed particles of dust still further enhance such wetting contacts of the granules and promote the tenacity with which the bonds adhere and lock the granules in position upon hardening or setting.

The clay substance or body of the granules being thoroughly matured or hardened, the granules are substantially permanently resistant to weathering and accordingly do not deteriorate with age.

Other modifications and adaptations of the invention will occur to those skilled in the art or arts to which it is related but such adaptations and modifications are to be considered as contemplated by the above disclosure and included within the scope of the following claims.

This application is a continuation in part of co-pending applications Serial No. 420,604, filed January 13, 1930 which has become Patent No. 1,792,058, and Serial No. 492,207, filed October 30, 1930.

I claim:

1. Method of preparing colored granules, comprising the steps of reducing a compact, finely porous argillaceous material to granular form, developing the hardness thereof by heating without substantial reduction of porosity, treating the hardened granules with a solution of a mineral coloring agent to produce absorption of the coloring matter therein, and heating the treated granules to fix the coloring agent therein.

2. Method of preparing colored granules, comprising the steps of reducing a compact, finely porous argillaceous material to granular form, selectively separating the harder, sized granules, developing the hardness thereof by heating without substantial reduction of porosity, treating the hardened granules with a solution of a mineral coloring agent to produce absorption of the coloring matter therein, and heating the treated granules to fix the coloring agent therein.

3. Method of preparing colored granules, comprising the steps of reducing a compact, finely porous argillaceous material to granular form, developing the hardness thereof by heating without substantial reduction of porosity, treating the granules with a solution of a mineral coloring agent to produce absorption of the coloring matter therein and heating the treated granules in a regulated atmosphere to develop the color required and render the coloring agent insoluble.

4. Method of preparing colored granules, comprising the steps of reducing a compact, dense, finely porous argillaceous material, susceptible to hardening by heat, to granular form, heating the granules to a temperature sufficient to harden the same without substantial reduction of porosity, treating the hardened granules with a solution of a mineral coloring agent to produce absorption of the coloring matter therein, and finally heating to fix the coloring reagent.

5. Method of making granules, comprising the steps of reducing a compact argillaceous material to grains of the desired range of sizes, separating the desired size or sizes therefrom, and heating the same to a hardening temperature in contact with a coating of dust particles of substantially the same composition as the granules to affix the same to said granules.

6. Method of making granules, comprising the steps of reducing a compact argillaceous shale to grains of the desired range of sizes, separating the desired size or sizes therefrom, and heating the same to a hardening temperature in contact with a coating of dust particles of substantially the same composition as the granules to affix the same to said granules.

7. Method of making granules, comprising the steps of reducing a compact raw clay to grains of the desired range of sizes, separating the desired size or sizes therefrom, and heating the same to a hardening temperature in contact with a coating of dust particles of substantially the same composition as the granules to affix the same to said granules.

8. Method of making granules, comprising the steps of reducing a compact argillaceous material to grains of the desired range of sizes, separating the desired size or sizes therefrom, and heating the same to a hardening temperature while agitating with dust particles of substantially the same composition as the granules to affix the same to said granules.

9. Method of making granules, comprising the steps of reducing compacted argillaceous material, which is susceptible to hardening by heat, to grains of the desired range of sizes, separating the desired size or sizes therefrom, treating with a coloring agent, and heating the same to a hardening temperature in contact with a coating of dust particles having substantially the same composition as the granules.

10. Method of making granules, comprising the steps of reducing compacted argillaceous material, which is susceptible to hardening by heat, to grains of the desired range of sizes, separating the desired size or sizes therefrom, treating with a coloring agent, and heating the same to a hardening temperature in contact with a coating of dust particles also containing a coloring agent and having substantially the same composition as the granules.

11. Method of making granules, comprising the steps of reducing a dense argillaceous material to grains of the desired range of sizes, separating the desired size or sizes therefrom, coating with dust of the original material, and heating the coated granules, preferentially to harden the granules and to fuse the dust particles thereto.

12. Method of making granules, comprising the steps of reducing compact argillaceous material which is susceptible to hardening by heat to grains of the desired range of sizes, separating the desired size or sizes therefrom, heating to a hardening temperature, coating with dust particles of substantially the same composition as the granules, and heating the coated granules preferentially to soften the dust particles and integrate them with the granule surfaces.

13. Method of making granules, comprising the steps of reducing compact argillaceous material which is susceptible to hardening by heat to grains of the desired range of sizes, separating the desired size or sizes therefrom, heating to a hardening temperature, coating with dust particles of substantially the same composition as the granules and containing a coloring agent, and heating the coated granules preferentially to soften the dust particles and integrate them with the granule surfaces.

14. Method of making granules, comprising the steps of coating heat hardened argillaceous granules with dust particles of substantially the same composition, and heating the same preferentially to soften and integrate the dust particles with the granule surfaces.

15. Granular material, the individual granules being characterized by a heat hardened body of argillaceous material having angular shapes corresponding to the fracture of the original material, and a coating of dust particles of substantially the same composition in integrated surface association therewith.

16. Granular material, the individual granules being characterized by a heat hardened body of argillaceous shale having angular shapes corresponding to the fracture of the original shale, and a coating of dust particles of substantially the same composition in integrated surface association therewith.

17. Granular material, the individual granules being characterized by a heat hardened body of compacted clay having angular shapes corresponding to the fracture of the original clay, and a coating of dust particles of substantially the same composition in integrated surface association therewith.

18. Granular material, the individual granules being characterized by a heat hardened body of argillaceous material having angular shapes corresponding to the fracture of the original material, and a coating of dust particles of substantially the same composition in integrated surface association therewith and containing a coloring agent.

RALPH L. ATKINSON.